United States Patent [19]

Tamura

[11] Patent Number: 5,640,556
[45] Date of Patent: Jun. 17, 1997

[54] SYNCHRONOUS/ASYNCHRONOUS CLIENT SERVER ACCESS BASED UPON DATABASE FILE RECORD ATTRIBUTE

[75] Inventor: Hidetaka Tamura, Kawasaki, Japan

[73] Assignee: Fujitsu Limited, Kawasaki, Japan

[21] Appl. No.: 590,046

[22] Filed: Jan. 3, 1996

Related U.S. Application Data

[63] Continuation of Ser. No. 121,638, Sep. 16, 1993, abandoned.

[30] Foreign Application Priority Data

Nov. 25, 1992 [JP] Japan ................................ 4-315284

[51] Int. Cl.$^6$ ........................................................ G06F 17/30
[52] U.S. Cl. .................................... 395/610; 395/200.09
[58] Field of Search .............................. 395/610, 200.09

[56] References Cited

U.S. PATENT DOCUMENTS

| | | | |
|---|---|---|---|
| 4,887,204 | 12/1989 | Johnson et al. | 395/600 |
| 5,046,002 | 9/1991 | Takashi et al. | 395/600 |
| 5,126,728 | 6/1992 | Hall | 340/825.3 |
| 5,237,684 | 8/1993 | Record et al. | 395/650 |
| 5,307,490 | 4/1994 | Davidson et al. | 395/650 |
| 5,329,619 | 7/1994 | Pagé et al. | 395/200 |

*Primary Examiner*—Thomas G. Black
*Assistant Examiner*—Paul R. Lintz
*Attorney, Agent, or Firm*—Staas & Halsey

[57] ABSTRACT

The present invention is for increasing operational speed for appending or updating data in a remote database system of the client-server type. When an operational unit of a client node accesses a record file in a server node, and when an attribute associated with an item to be accessed is the likely source of error on accessing, to an output command to the record file in the server node, synchronous operation is performed where the client node waits for notification of an output completion result from the server node and then proceeds to the subsequent transactions. On the other hand, asynchronous operation is performed, when there is no possibility of error, where the client node proceeds to the subsequent transactions without waiting for notification of an output completion result from the server node.

17 Claims, 12 Drawing Sheets

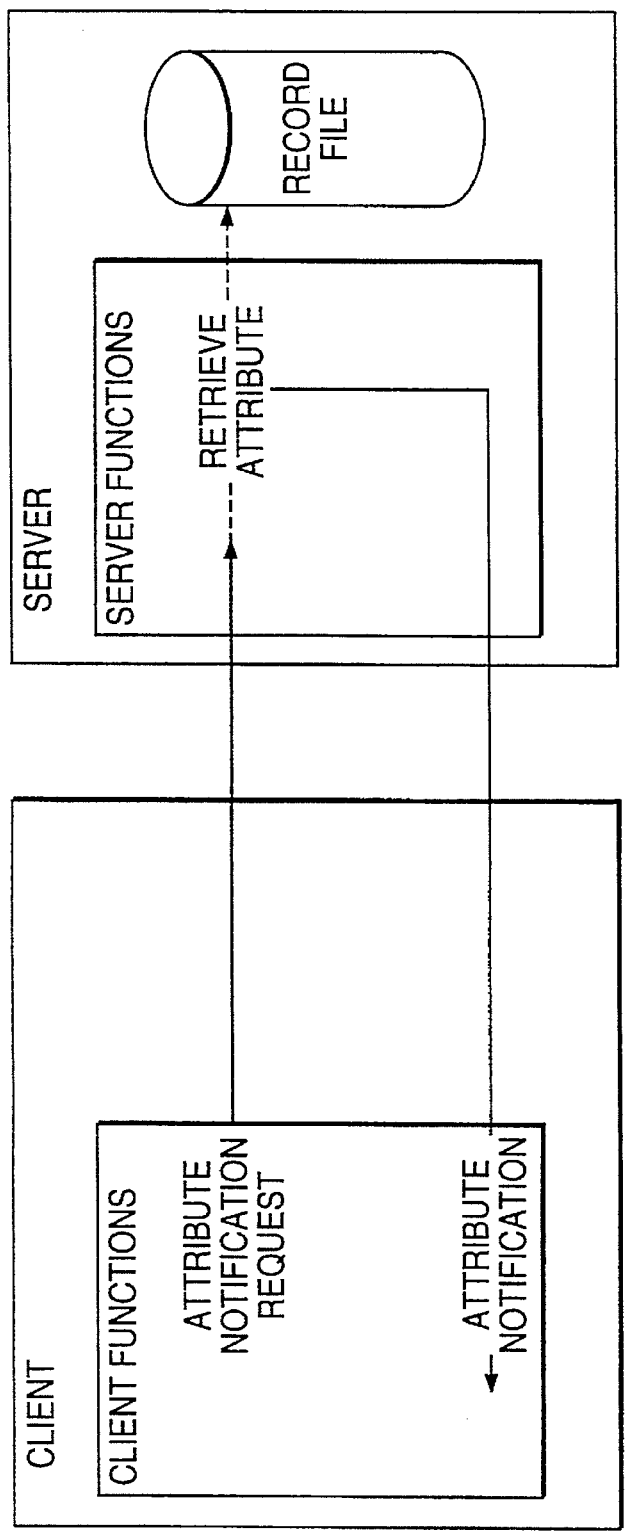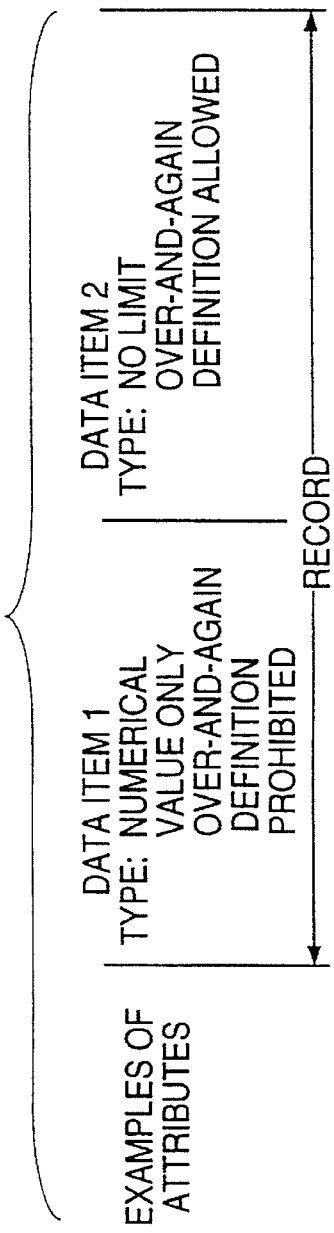

NOTE: FOR A FIRST ATTRIBUTE NOTIFICATION REQUEST ONLY

NOTE: FOR A FIRST ATTRIBUTE NOTIFICATION REQUEST ONLY

SYNCHRONOUS/ASYNCHRONOUS CLIENT SERVER ACCESS BASED UPON DATABASE FILE RECORD ATTRIBUTE

This application is a continuation of application Ser. No. 08/121,638, filed Sep. 16, 1993, now abandoned.

BACKGROUND OF THE INVENTION

1. Field of the Invention

This invention generally relates to a database running on a computer network based on a client-server architecture. More particularly, this invention relates to a method and apparatus for managing a database through a remote data processing system including client nodes that access individual files managed by a server node.

2. Description of the Related Art

It can make more efficient use of a database to provide the same running on a computer network based on a client-server architecture controlled by, for example, a version of a UNIX (UNIX is a trademark of American Telephone and Telegraph, Incorporated) operating system and, to allow a plurality of client nodes to access a common or distributed database managed by a server node. For this purpose, the server node maintains database files. Likewise, the client node maintains application programs for requesting information or applications from the prospective server or servers. The client node executes these application programs to manipulate a database for changing information therein such as retrieving, appending and updating data. In this event, when the client node accesses a record file maintained by the server node for updating or appending data, control is passed to the server node and the client node is suspended until the former completes delivery of data. The client node can perform subsequent transactions only after it confirms that the server node can deliver the data without any trouble, i.e., data are properly updated or appended. Such confirmation-based operation is referred to as synchronous operation hereinbelow.

In the synchronous operation of the type described, the client node must wait for rendezvous with an output from the server node. In other words, the client node is hindered from performing any subsequent transactions until the server node completes its output operation. Accordingly, there is much overhead during communication processing which degrades the performance of the system.

It seems that so-called asynchronous operation may be a solution to this synchronization problem. When a client node sends a solicit message to the prospective server for updating or appending data, it can perform subsequent transactions without waiting for the server node to complete delivery of data. The performance of the system is improved because there is no necessity for rendezvous, hence the use of term asynchronous operation. However, the synchronization problem is not completely solved. Consider a database in which the data record contains data items prohibited from being defined over and again. It is impossible to notify the client node of the unexpected definition of the data item over and again. The data record may also contain a data item of a particular type (e.g., numerical values only). The client node will never be notified of data error caused by an attempt to obtain data of an inadequate type. The challenges include avoiding such inconvenience accompanying the asynchronous transaction. In this respect, an object of the present invention is to improve the above-described drawbacks and increase access speed to a database in a remote data processing system.

SUMMARY OF THE INVENTION

According to the present invention, a server node first sends to the prospective client node an attribute associated with each data item of a data record in response to an attribute notification request from the client node. The client node verifies this attribute according to its attribute kind. The result of verification may indicate the presence of data with the attribute associated with the data item which should not be defined over and again or conflicted in the file during updating or appendix of data. A data record including such data item is supplied to the file in synchronous mode as the case where there is the data item required to be checked. On the other hand, if the client node receives an attribute that has no possibility of conflicted data contents, the data record is supplied to the file in asynchronous mode. When the result of verification indicates that there is any data item required to be checked, the client node further verifies the validity of each data item based on the data relating to the data item. If the data item is determined as the valid one, the data record in question is appended to the file in asynchronous mode. Otherwise, pseudo error notification is generated and notified an operational unit. In response to this, an application of the operational unit ceases the operation.

When the above mentioned asynchronous operation is performed, an error may actually be caused on the output to the file. In this event, this abnormal result is held by the client node and notified at the next time when the application maintained by the client node issues a request for the output. In this manner, the application is interrupted further operation.

Other advantages and features of the present invention will be described in detail in the following preferred embodiments thereof.

BRIEF DESCRIPTION OF THE DRAWINGS

FIG. 2(a) is a view showing control flow for retrieving an attribute associated with a data item;

FIG. 2(b) shows exemplified attributes;

DESCRIPTION OF THE PREFERRED EMBODIMENTS

Preferred embodiments of the present invention will be described with reference to the drawings. Throughout the

Control (1)

Provided is means for allowing a client node 29 to retrieve an attribute associated with each data item of a record file 21 maintained by a server node 25.

Figure 1:
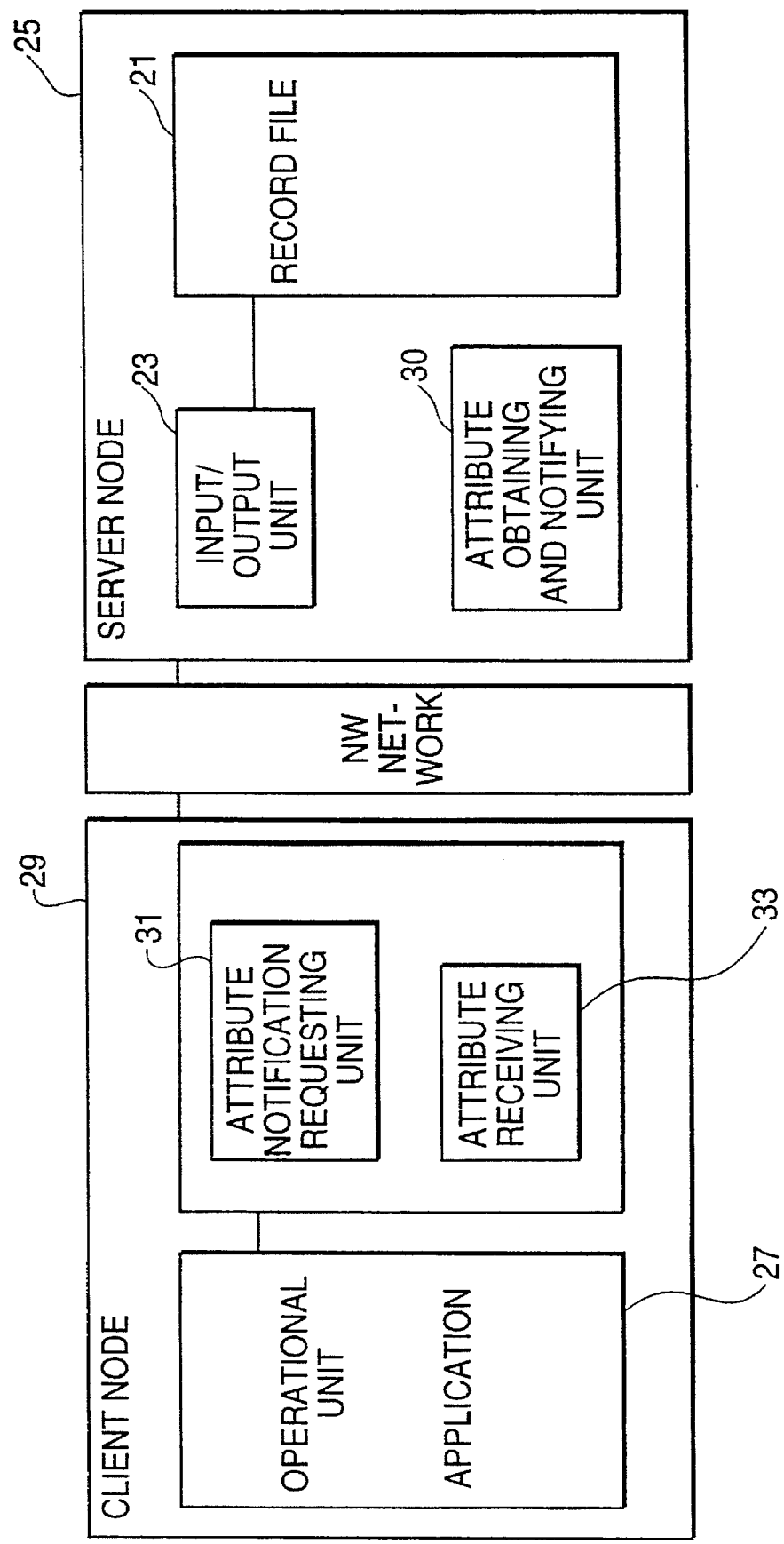
FIG. 1 is a block diagram useful in understanding a first principle of the present invention.

The principle of this is shown in FIG. 1, in which the server node 25 comprises the record file 21 for a database and an input/output unit 23 for an access to the record file 21. The server node 25 is connected to the client node 29 through a communication network (NW). The client node 29 is provided with an operational unit 27 for supplying a control command to the input/output unit 23 to operate the record file 21. The record file 21 contains data sets each of which has an attribute representing characteristics of the corresponding data set. The client node 29 accesses the record file 21 with the operational unit 27. In this event, the server node 25 notifies the client node 29 of the attribute in response to an attribute notification request supplied from the client node 29. The client node 29 controls the input/output unit 23 in the server node 25 according to this attribute. For issuing the attribute notification request, the client node 29 comprises an attribute notification requesting unit 31. The server node 25 comprises an attribute obtaining and notifying unit 30 for obtaining the attribute in response to the attribute notification request given by the attribute notification requesting unit 31 and for notifying the client node 29 of this attribute. In addition, an attribute receiving unit 33 is provided with the client node 29 for receiving the attribute transmitted from the server node 25.

Examples of the attributes associated with data items are as follows:

(1) Length of the data item
(2) Type of the data item (e.g., the data item of numerical values only, or the data item of alphanumerical values only)
(3) Uniqueness of the data item (whether or not the data item can accept duplicate data)

Examples of attributes are shown in FIG. 2(b).

Figure 5:
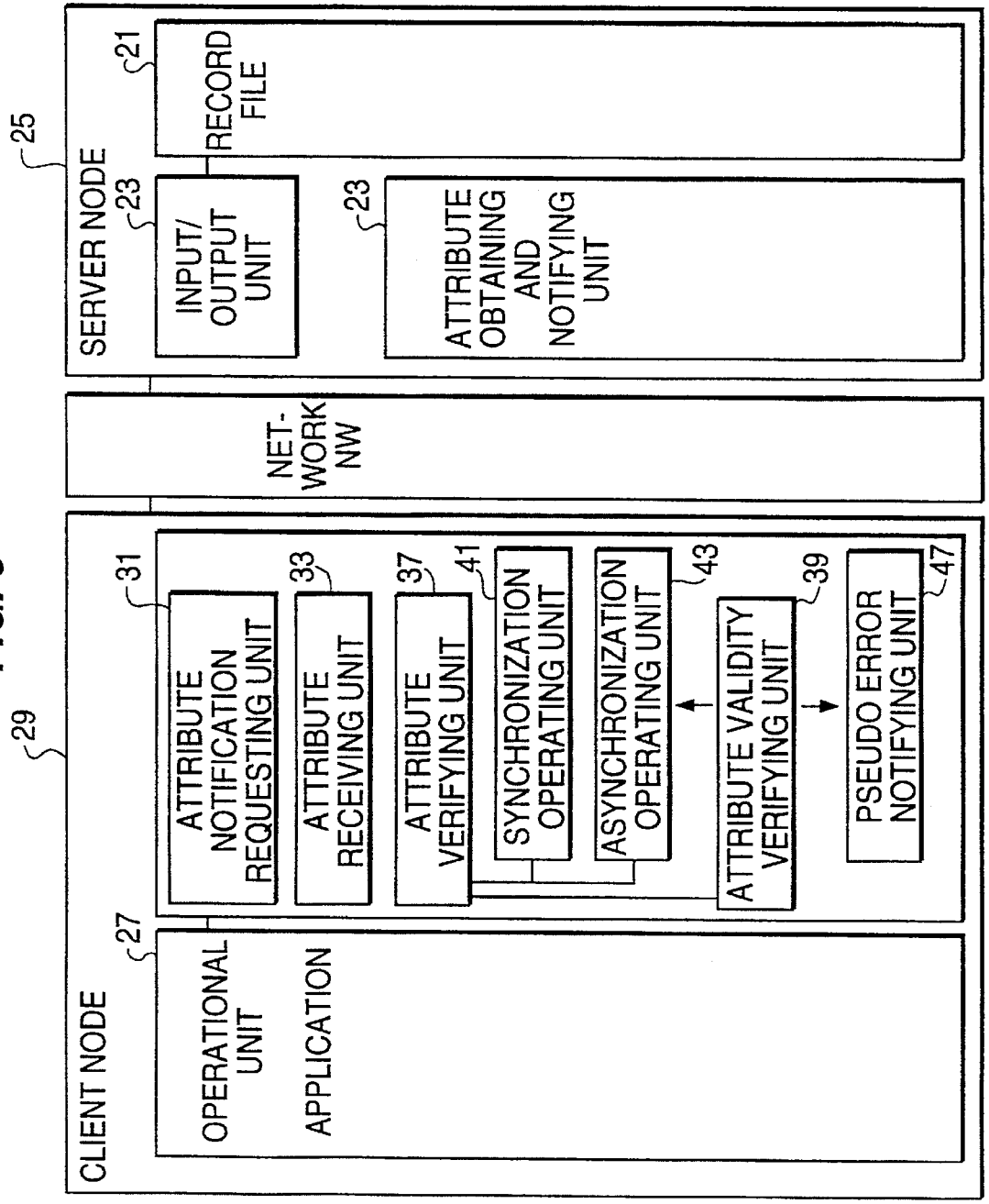
FIG. 5 is a block diagram useful in understanding a third principle of the present invention.

According to the present system, it becomes possible for the client node 29 to check probabilities of error condition on a record data ready to be retrieved. For this check, the client node 29 may comprise an attribute verifying unit 37 or an attribute validity verifying unit 39, as shown in FIG. 5.

Alternatively, the validity of the attributes may be verified by an attribute validity verifying unit without verifying the attributes by an attribute verifying unit.

Allowing the client node 29 to check the probabilities of error on a record to be retrieved from the server node 25 makes it possible to notify applications of this error of an improper record without carrying out communication processing. This results in an improved operation throughput. The operational unit 27 is realized by application programs stored in the client node 29.

FIG. 2(a) shows a control flow for retrieving an attribute associated with a data item.

Control (2-1)

Before output of the record data, the attribute verifying unit 37 in the client node 29 determines, in accordance only with the attribute name, whether or not each data item of the record file 21 on the server node 25 includes an attribute required to be checked. In other words, the attribute verifying unit 37 determines whether the data item is the likely source of error such as appending duplicate data or conflicting data on accessing. The asynchronous operation is performed only when there is no attribute required to be checked.

On the other hand, if there is an attribute required to be checked, this check is made in accordance only with the attribute name. For example, a database would be the set of cards, each detailing the employees' name, age, social security number and other relevant information. It is apparent without checking the data that the attribute associated with the social security number should not be defined over and again. Accordingly, the attribute is considered without checking the data as the one having possibility of the error when the attribute associated with the social security number of the employees. Such attribute is subjected to the synchronous operation.

For performing the asynchronous operation, the application is notified of a result (pseudo result) that the record is retrieved without any trouble. Notification of the pseudo result allows the application to continue operation.

Figure 3:
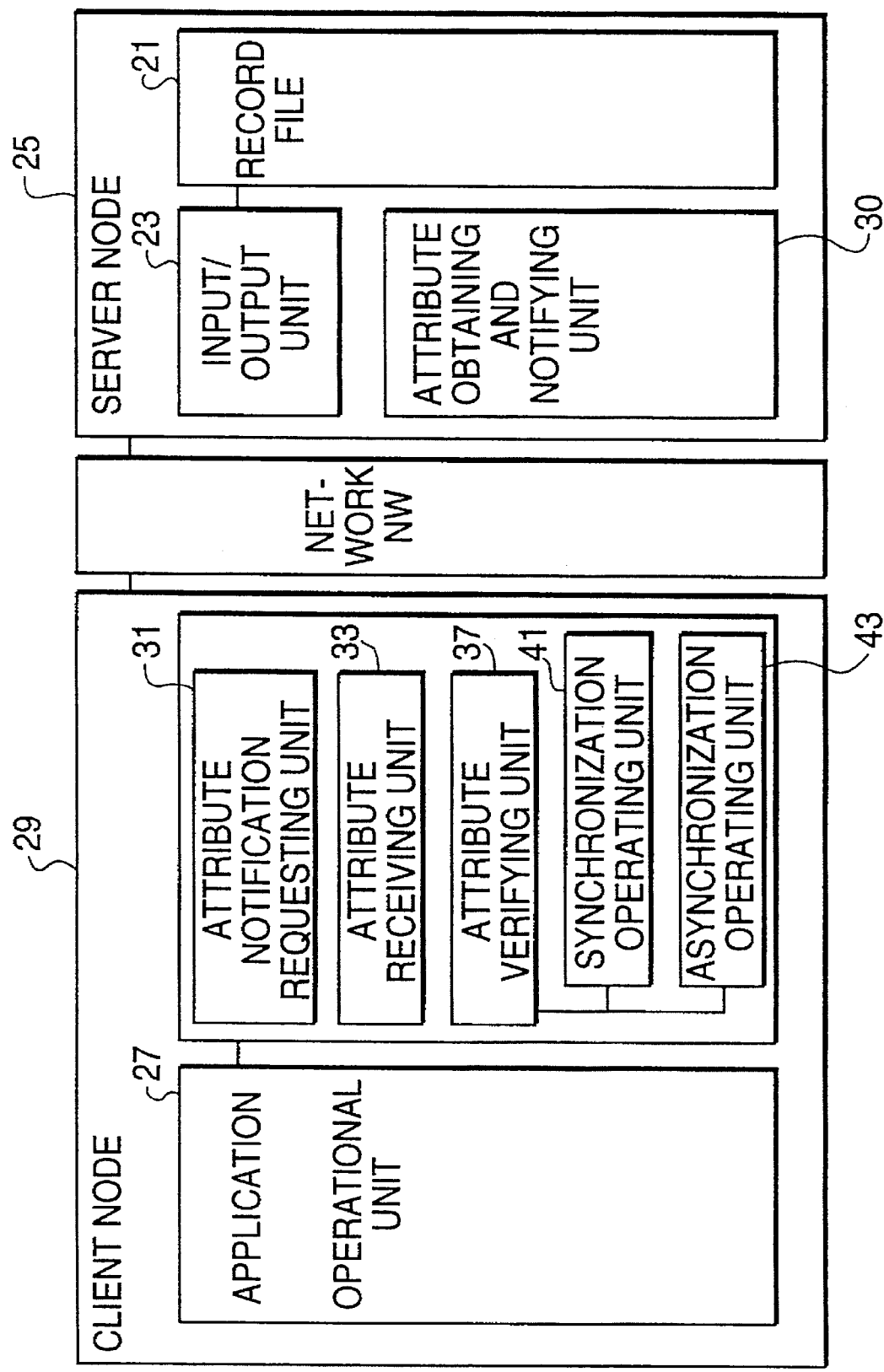
FIG. 3 is a block diagram useful in understanding a second principle of the present invention.

When there is any data item required to be checked, the synchronous operation is performed to wait for rendezvous with an actual output of the record on the server node 25. Detection of an error on the server node 25 will be, if any, notified the application, i.e., the operational unit 27. For achieving this control (2), the client node 29 comprises a synchronization operating unit 41 and an asynchronization operating unit 43 as shown in FIG. 3. The synchronization operating unit 41 is for a case where the attribute verifying unit 37 determines that one or more attribute(s) should be checked. In such a circumstance, the client node 29 is required to wait for an output result supplied from the server node 25 to the operational unit 27 of the client node 29 before proceeding with the subsequent transaction to an output command to the record file 21 in the server node 25. On the other hand, the asynchronization operating unit 43 is for a case where the attribute verifying unit 37 determines that there is no attribute required to be checked. In such a circumstance, the client node 29 can proceed with the subsequent transaction by means of notifying, by the client node 29 itself, the pseudo result representing completion of output to the operational unit 27 of the client node 29 without waiting for an output completion notification supplied from the server node 25 to an output command to the record file 21 in the server node 25.

The asynchronization operating unit 43 may be: (1) an unit where the client node 29 notifies, by the client node 29 itself, the operational unit 27 of the client node 29 of the pseudo result representing completion of output without waiting for an output completion notification supplied from the server node 25 when the output command to the record file 21 in the server node 25 is supplied from the client node 29; and (2) a buffering operational unit for subsequently storing the output commands to the record file 21 in the server node 25 in a buffer memory disposed in the client node 29 before transmitting the same from the client node 29, notifying the pseudo result representing completion of output at every time when the output command is stored in the buffer memory, and for sending the commands together to the server node 25 when a predetermined number of commands are stored in the buffer memory.

Figure 4:
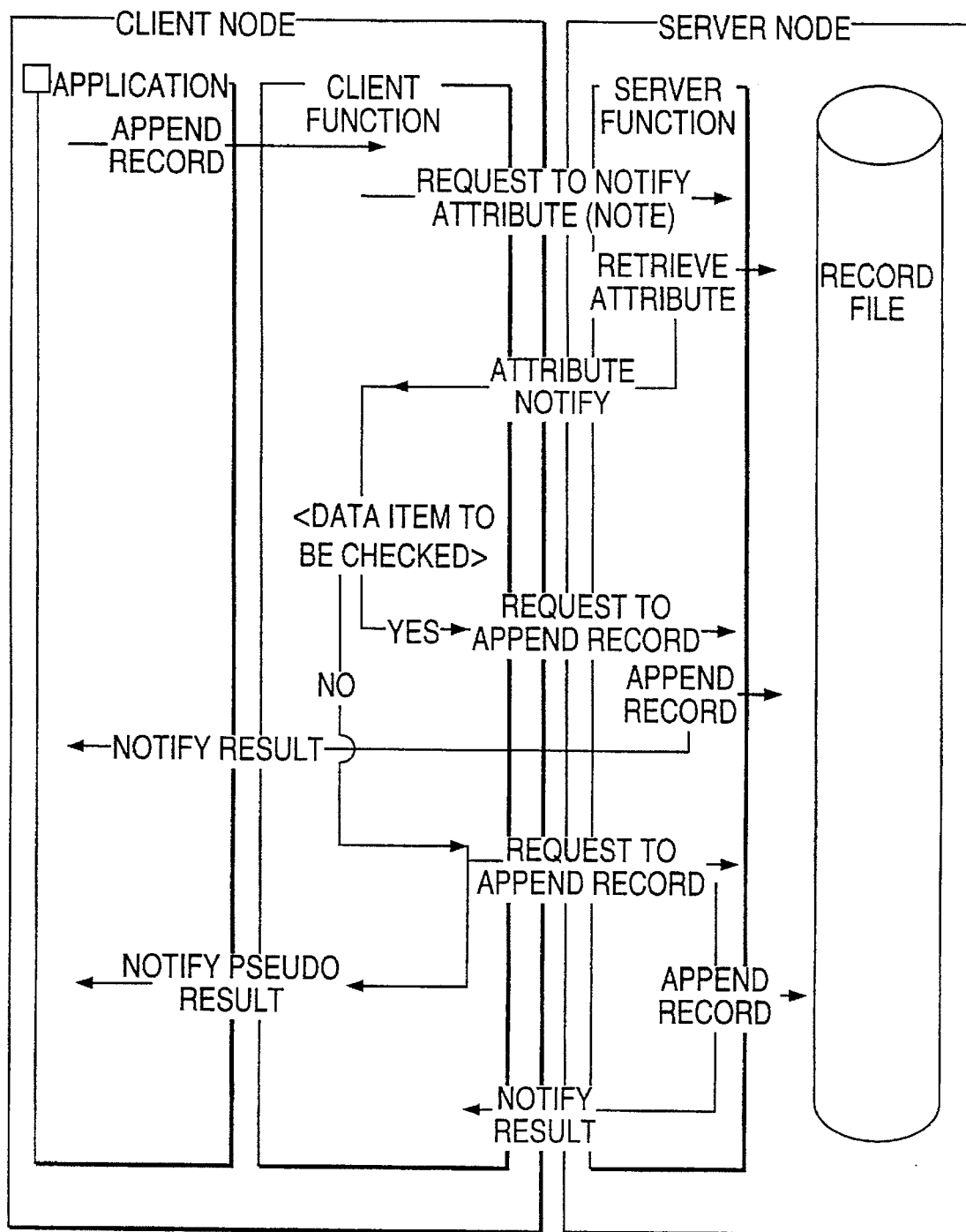
FIG. 4 is a view showing control flow on Control (2-1)

FIG. 4 shows an example of the control flow according to this control system.

Control (2-2)

As shown in FIG. 5, the validity of the attributes may be checked by the attribute validity verifying unit 39 on the client node 29 when the result of the verification carried out by the attribute verifying unit 37 indicates that there is any attribute required to be checked, or even without checking the kind of attribute by the attribute verifying unit 37.

The validity check differs from the verification performed by the attribute verifying unit 37. The verification is for determining the possibility of an error condition according only to the attribute name. On the contrary, the validity check is to determine whether or not an error condition is expected to happen on the data itself given for the attribute. For example, validity check is directed to determine whether or not any attribute associated with the data item is defined as the one other than numerical values for the data item that is ought to be defined by the attribute of numerical values only. More particularly, when the data type of the attribute associates with the numerical values, data containing characters such as kanji or alphabets always results in the operational error. The term validity check here involves determining possibilities of occurrence of the error condition achieved by comparing the data stored in the file 21 with the data to be supplied to the file 21. For example, when the updated record is compared with the record before updating, it is determined if the contents of the data items that are prohibited from being defined over and again is modified or not. The determination results may be: modified, invalid (with a risk of error), not modified, and valid (without any risk of error).

As shown in the principle view in FIG. 5, the attribute validity verifying unit 39 determines the validity. If the attribute is determined as the invalid one, i.e., the attribute is determined as the likely source of error on the server node 25, a pseudo error notifying unit 47 in the client node 29 supplies a pseudo error notification to the operational unit 27 in the client node 29 to cease or stop the operation.

When the attribute is determined as the valid one, i.e., the attribute is determined as the one that will never cause the error on the server node 25, it is possible to perform the asynchronous operation to proceed with the subsequent transaction by means of notifying, from the client node 29 itself, the operational unit 27 of the client node 29 of a pseudo result representing completion of output without waiting for an output completion notification supplied from the server node 25 to an output command to the record file 21 in the server node 25.

Figure 6:
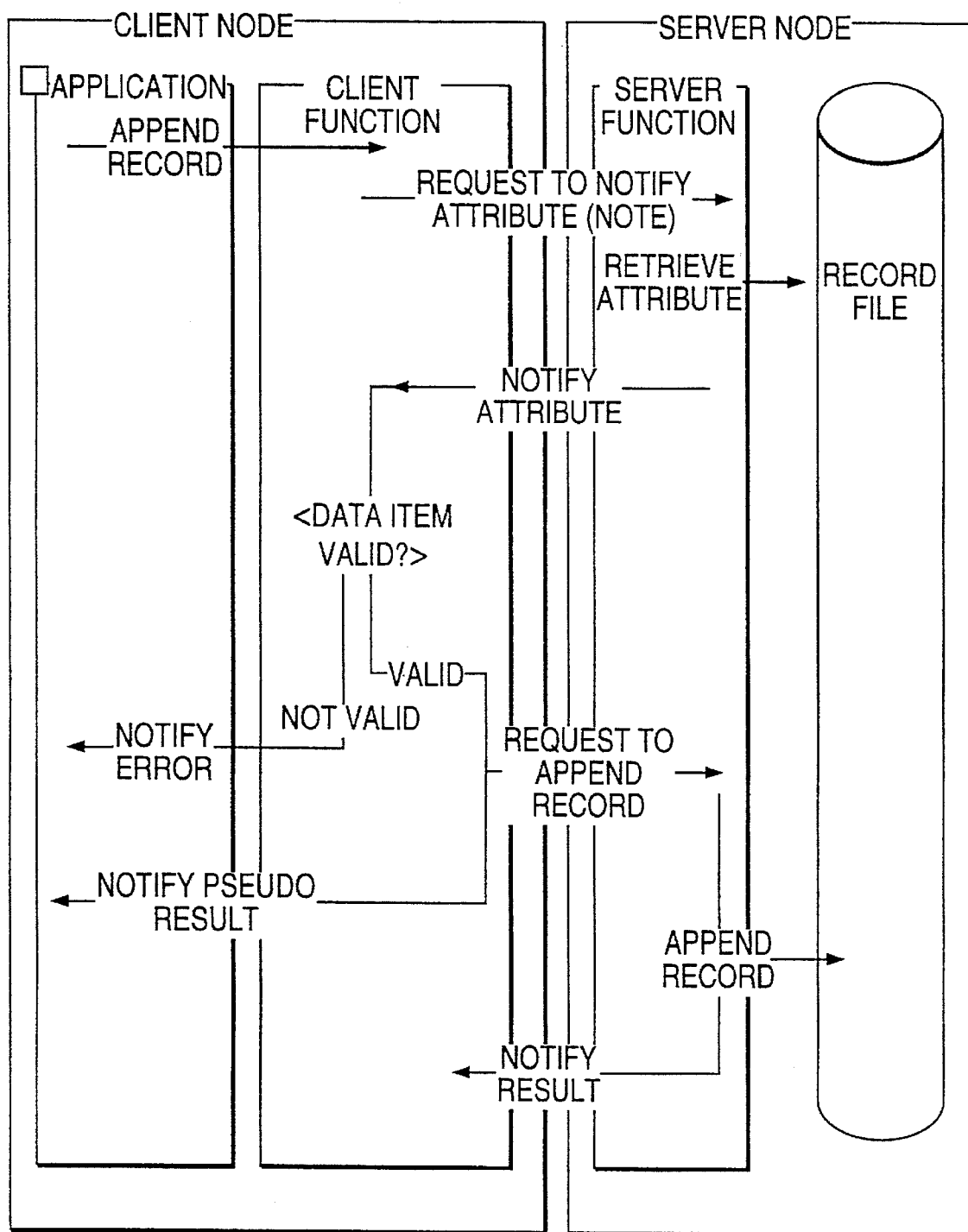
FIG. 6 is a view showing control flow on Control (2-2) to determine validity on data items required to be checked.

An exemplified control flow for the above case is shown in FIG. 6.

Control (3)

With the system described in conjunction with the Controls (1) and (2), no error will be caused in general on the output to the file. However, malfunction of the device or a lack of capacity in the secondary storage device may be caused. In such a circumstance, the operational unit 27 (application) on the client node 29 should be notified of this error, otherwise the application on the client node is continued in vain. To avoid this, the following control will be made.

Figure 7:
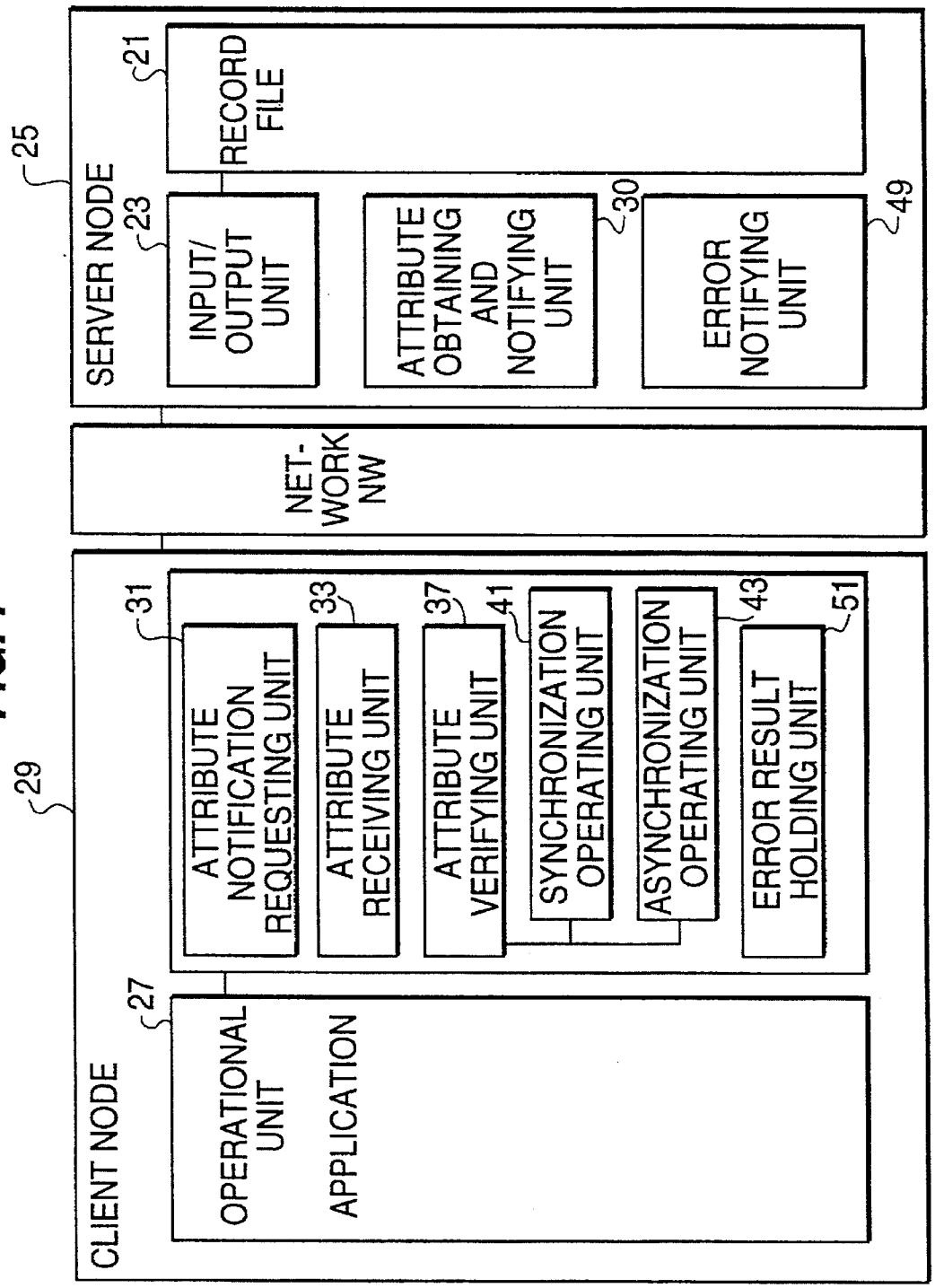
FIG. 7 is a block diagram useful in understanding a fourth principle of the present invention.

The asynchronous operation is applied to the output to the database file 21 (record file 21) on the server node 25. When the output is actually given to the server node 25 and the error is detected, as shown in FIG. 7, an error detecting unit 51 on the client node 29 holds the operational result that indicates the occurrence of the error notified by the error notifying unit 49 on the server node 25. This operational result is notified at the next time of accepting the output request from the application.

Figure 8:
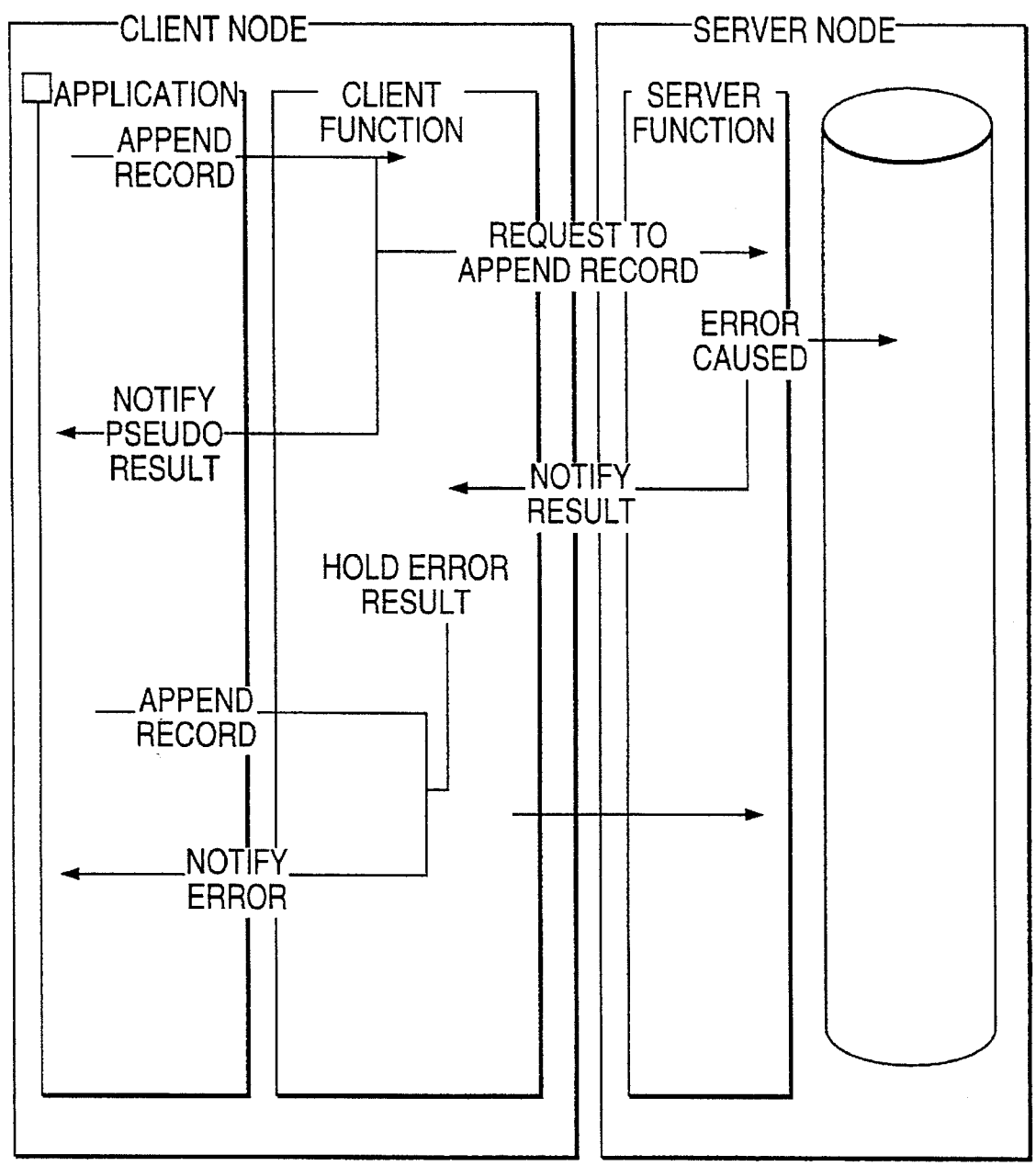
FIG. 8 is a view showing control flow on Control (3) to notify of an error happened in a server node.

The application on the client node 29 is capable of ceasing its operation when it is notified of the error, thereby avoiding continuation of the operation in vain. The control flow for such a case is shown in FIG. 8.

Embodiments will be described more in detail concerning the updating, appending and batch processing of the records.

Figure 9:
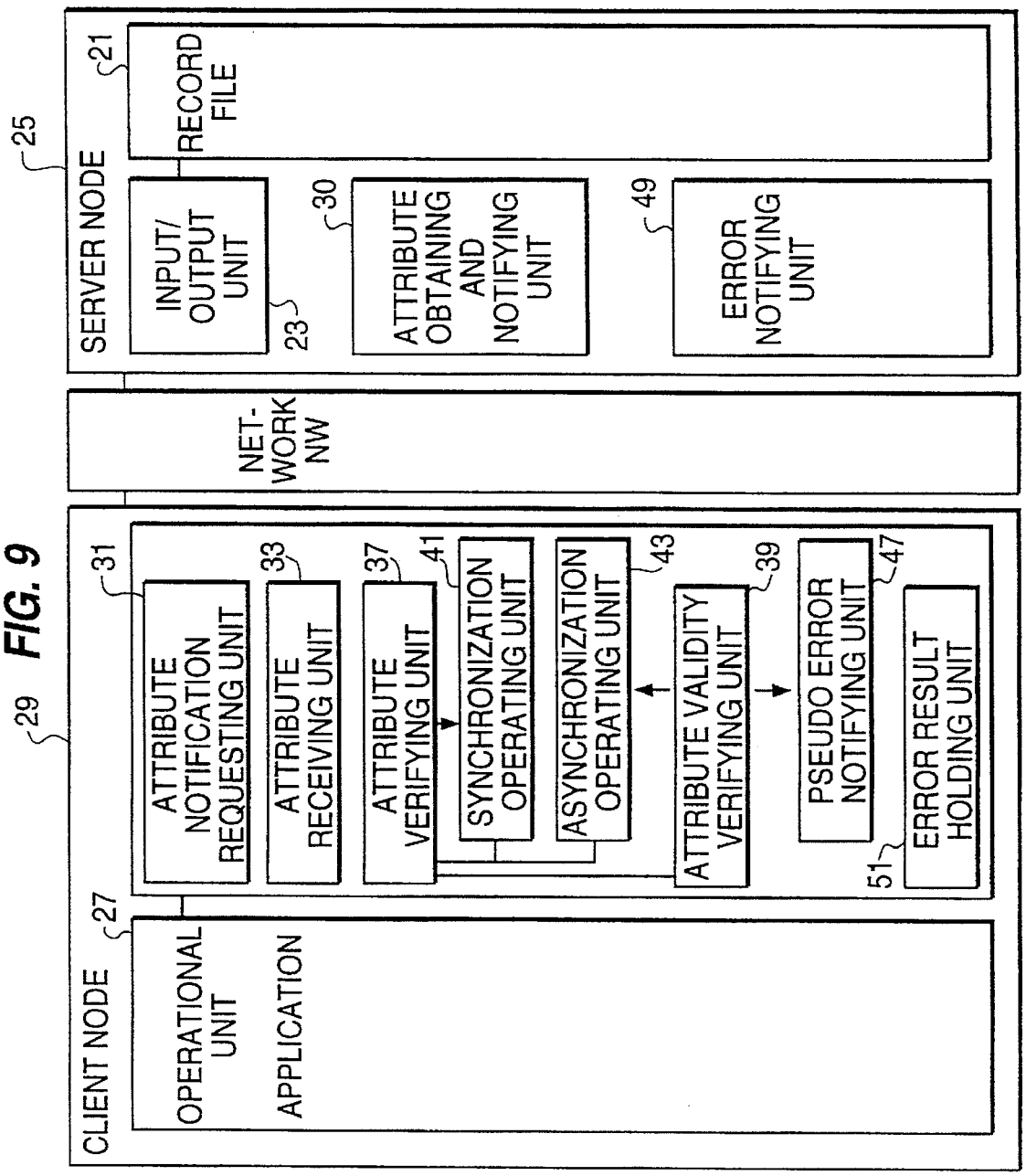
FIG. 9 is a block diagram showing an embodiment according to the present invention.

A system structure of this embodiment is shown in FIG. 9. In FIG. 9, a server node 25 implemented by a computer is linked to a client node 29 implemented by a computer through a network. In general, two or more client computers 29 are linked together to form a network. The server node 25 is provided with the record file 21 for storing data in the database. This record file 21 is stored in a secondary storage device or an external storage device. The file format of the record file 21 may be hierarchical. The data set is arranged based on a certain attribute for every one hierarchical item. The file format of the record file 21 may be any one of adequate formats, as long as the attributes are involved.

The server node 25 also has a general server function, the input/output unit 23 to access the record file 21 for writing a new data, updating, appending and retrieving the data. The server function is the one for processing the request issued by the client node 29 through the input/output mechanism to the record file 21. The server 25 function may combine the input/output function of the record file 21. The server node 25 also comprises the attribute obtaining and notifying unit 30 for notifying the client node 29 of the attribute associated with the data file in response to the request from the client node 29. The server node 25 further comprises the error notifying unit 49 for notifying the client node 29 of the error, if the error occurs on the input and output of the data in the data file 21. The server node 25 is implemented by a computer. The input/output unit 23, the attribute obtaining and notifying unit 30 and the error notifying unit 49 are realized by means of loading the program stored in a main memory into a central processing unit.

The client node 29 is provided with, other than the general client function, the operational unit 27 for accessing the record file 21 of the database. The operational unit 27 is realized by the application program stored in the main memory. The client function is the one for sending the request to process the application (such as updating or appending the record or records) send to the server function and receiving the result. The client node 29 comprises the attribute notification requesting unit 31, the attribute receiving unit 33, the attribute verifying unit 37, the synchronization operating unit 41, the asynchronization operating unit 43, the attribute validity verifying unit 39 and the pseudo error notifying unit 47. The attribute notification requesting unit 31 issues the attribute notification request to the server node 25. The attribute receiving unit 33 receives the attribute transmitted from the server node 25. The attribute verifying unit 37 checks the attribute received. The synchronization operating unit 41 performs the subsequent transactions in synchronous mode in response to the verification result obtained by the attribute verifying unit 37. The asynchronization operating unit 43 performs the subsequent transactions in asynchronous mode in response to the verification result obtained by the attribute verifying unit 37. The attribute validity verifying unit 39 verifies the validity of the attribute which has already been verified by the attribute verifying unit 37. The pseudo error notifying unit 47 sends the pseudo error notification to the operational unit 27 when the attribute validity verifying unit 39 determines invalidity of the attribute.

Operation will be described for updating, appending and batch processing with the remote data processing system managing the database.

<Embodiment for Updating the Records>

Figure 10:
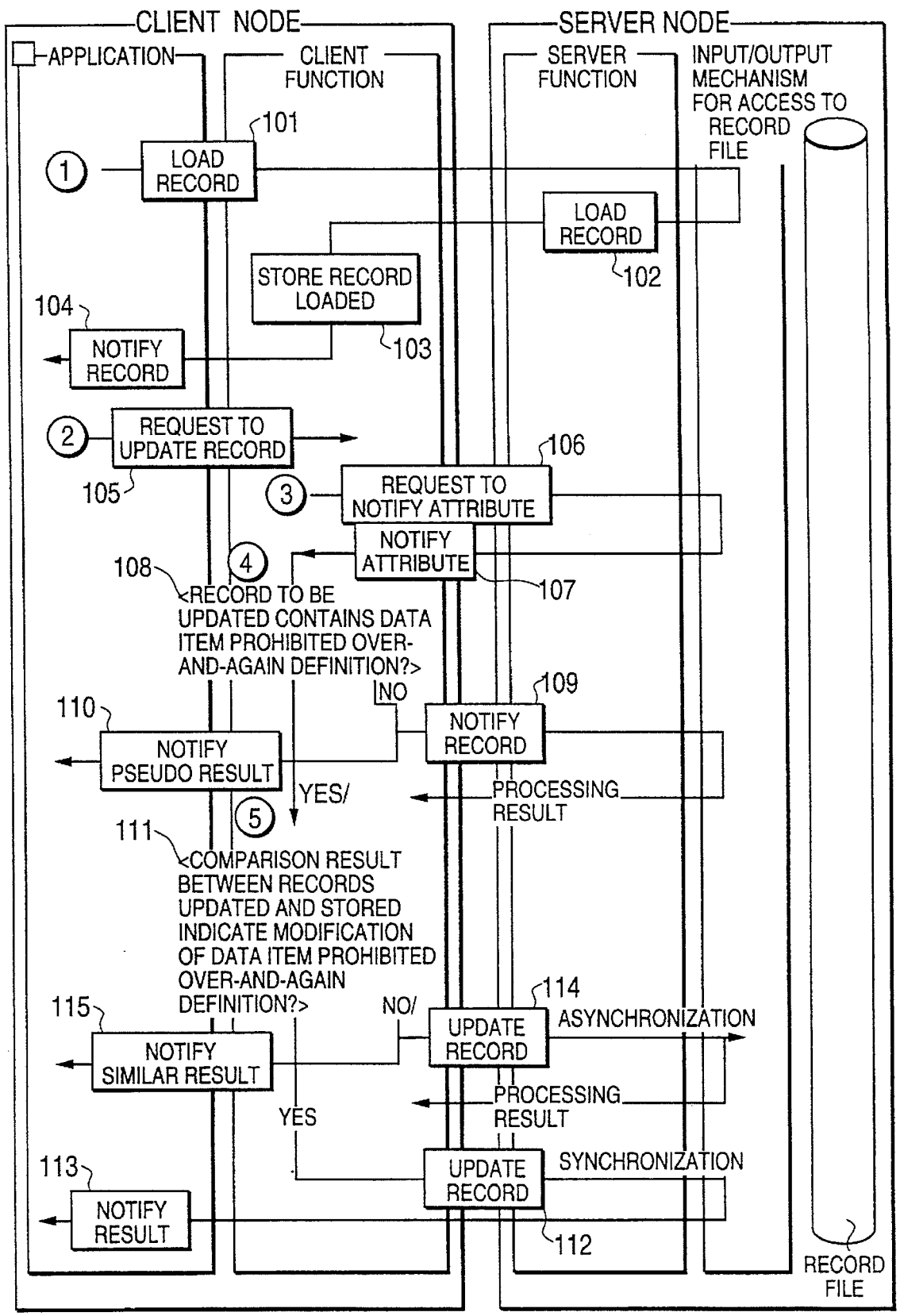
FIG. 10 shows an embodiment of a case for updating data records.

An embodiment for updating records in asynchronous mode is shown in FIG. 10. For this purpose, the application first retrieves the record, following which it modifies and updates the content of the record. When all data items can be defined over and again, the updating is made in asynchronous mode. Otherwise, the client node determines whether or not modification is made on the content of the data item prohibited to be defined over and again. If not, the updating is made in asynchronous mode. On the contrary, any modification results in the rendezvous with the server node 25. More particularly, the client node 29 must wait for the completion of updating made on the server node 25 because the modification means such possibility that the error is notified on actual updating, indicating redundancy or duplication of the records. An example of the data item prohibited to be defined over and again is the social security number in the database collecting data relating to a company's employees. One social security number for different employees conflicts the data.

Control flow is now described in detail with reference to FIG. 10.

(1) The application requests for retrieving the record (Step 101). The client 29 function propagates this request to the server 25 function which acts for the client node 29 to retrieve the record (Step 102). The client 29 function is notified of the retrieved record. In this event, the client 29 function store the retrieved record (Step 103) to notify the application of it (Step 104).

(2) The application requests for updating the record notified in the above mentioned steps (1) (Step 105).

(3) The attribute notification requesting unit 31 issues the attribute notification request to the server 25 function only when the attribute associated with each data item of the record file 21 in question has not yet been retrieved from the server node 25 (Step 106). The attribute obtaining and notifying unit 30 retrieves the attribute to notify the client node 29 of it (Step 107). As a result, the attribute associated with each data item of the record file 21 subjected to be accessed is determined (in that whether it is allowed to be defined over and again).

(4) The attribute received by the attribute receiving unit 33 is then verified in the attribute verifying unit 37 to determine whether or not the record to be updated contains the data item prohibited from being defined over and again (Step 108). When all data items can be defined over and again, the asynchronous operation will never cause an error of redundancy. Accordingly, the asynchronization operating unit 43 requests in the asynchronous manner the server 25 function to update the record (Step 109). In this event, the asynchronization operating unit 43 notifies the application of the pseudo result, indicating that the updating is completed without any trouble (Step 110). On the contrary, when any data item is prohibited from being defined over and again, it is inadequate to request update operation asynchronously to the server 25 function. The attribute validity verifying unit 39 thus carries out determination operation as described in the following steps (5) (Step 111 ).

(5) The attribute validity verifying unit 39 compares the record to be updated with the record notified in (1). When modification is made on the content of the data item prohibited to be defined over and again, the synchronization operating unit 41 requests the server node 25 to update the record (Step 112) and then waits for the completion of updating (Step 113) because the modification means such possibility that the error is notified on actual updating indicating redundancy of the records. If no modification is made on the data item prohibited to be defined over and again, the updating will never cause an error of redundancy. Accordingly, the asynchronization operating unit 43 requests in the asynchronous manner the server 25 function to update the record (Step 114). In this event, the asynchronization operating unit 43 notifies the application of the pseudo result, indicating that the updating is completed without any trouble (Step 115).

If the request for updating the record in asynchronous mode comes up to abnormal end due to the malfunction of the device or the like, the server 25 function supplies the operational result to the client 29 function that indicates the occurrence of an error. The client node 29 holds this operational result in the operational result holding unit 51. The operational result holding unit 51 is capable of ceasing its operation by notifying the application of this error when the application issues a request later.

<Embodiment for Appending the Records>

Figure 11:
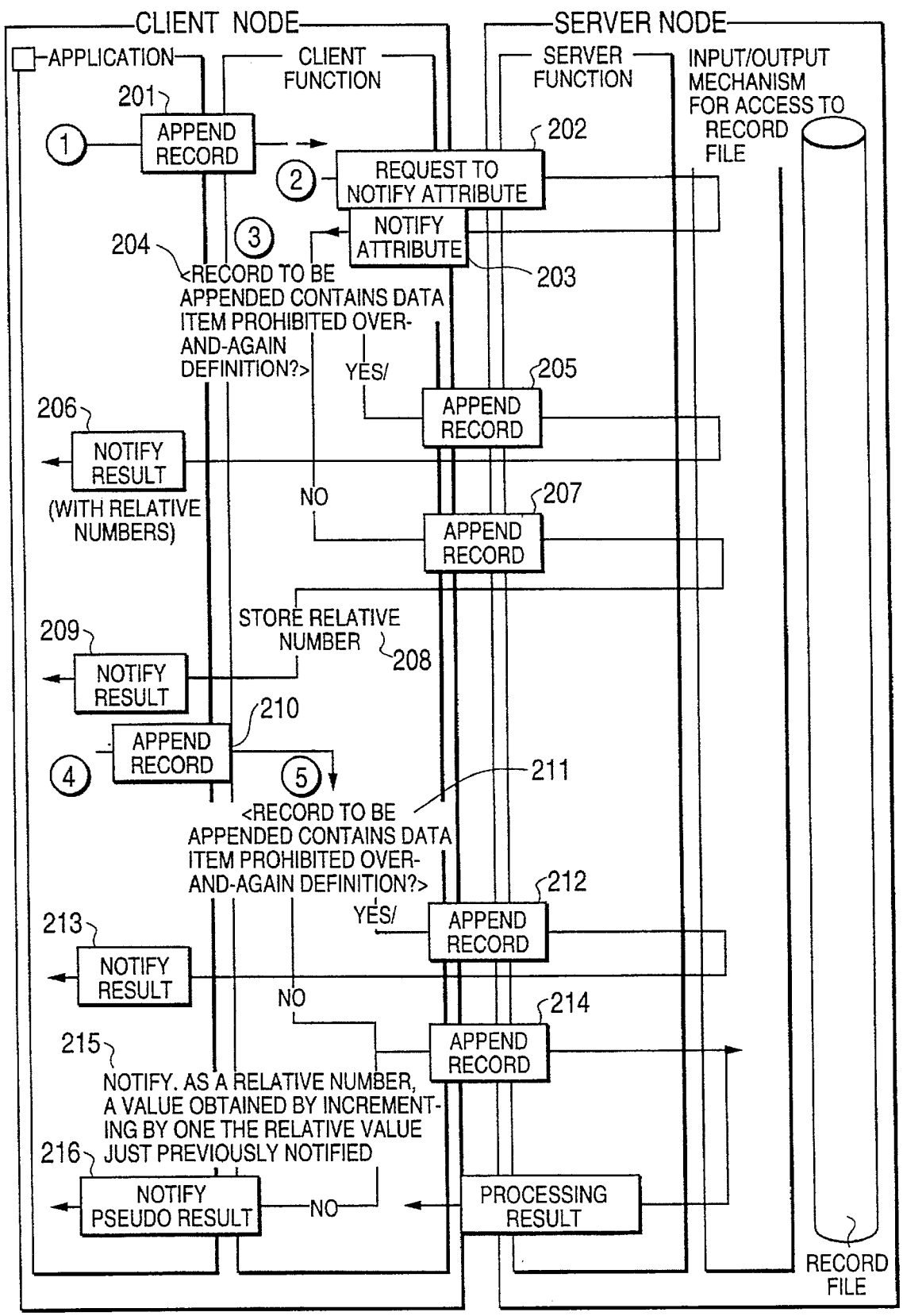
FIG. 11 shows an embodiment of a case for appending data records.

An embodiment for appending records in asynchronous mode is shown in FIG. 11. It is assumed that the application is notified of the relative number of the additional record as a result of the appending operation. When all data items can be defined over and again, the addition is made in asynchronous mode. Otherwise, the client node 29 must wait for the completion of appendix made on the server node 25 because there is a possibility that an error is notified on appending, indicating redundancy of the records (synchronous operation). It is noted that the client node 29 in asynchronous operation once waits for the completion of the appending operation on the server node 25 to notify the application of the relative number for the additional record. The relative number of the additional record is stored. Operation at the second time or later allows the server 25 function to request appending of the record in asynchronous mode. The application is notified of the value, as the relative number for the record of the latest appendix, obtained by means of incrementing by one the relative number of the record just previously appended.

Control flow is now described in detail with reference to FIG. 11.

(1) The application requests appendix (Step 201 ).

(2) The attribute notification requesting unit 31 issues the attribute notification request to the server 25 function only when the attribute associated with each data item in the record file 21 in question has not yet been retrieved from the server node 25 (Step 202). The attribute obtaining and notifying unit 30 retrieves the attribute to notify the client node 29 of it (Step 203). As a result, the attribute associated with each data item of the record file 21 subjected to be accessed is determined (in that whether it is allowed to be defined over and again).

(3) The attribute received by the attribute receiving unit 33 is then verified in the attribute verifying unit 37 to determine whether or not the record to be updated contains the data item prohibited from being defined over and again (Step 204). When any data item is prohibited from being defined over and again, the synchronization operating unit 41 requests the server node 25 to append the record (Step 205) and then waits for the completion of updating (Step 206) because the appendix may results in the error notified, indicating redundancy of the records. The client node 29 waits for the completion of appendix on requesting the appendix of the record to the server node 25 even if any data item prohibited to be defined over and again (Step 207). This is because the appending operation is made at the first time and it is necessary to retrieve the relative number for the record to be appended. The relative number notified is stored when the server 25 function notifies it of the operational result (Step 208). Subsequently, the application is notified the result (Step 209).

(4) The application requests to append the subsequent record (Step 210). At that time, no attribute notification request is issued because the attribute has already been retrieved.

(5) It is determined whether the data item for the appendant record includes the data item verified by the attribute verifying unit 37 and found as the one prohibited from being defined over and again (Step 211). When there is any data item prohibited from being defined over and again, the synchronization operating unit 41 requests the server node 25 to append the record (Step 212) and then waits for the completion of appending operation (Step 213) because the error may be notified as a result of appendix, indicating redundancy of the records. When all data items are allowed to be defined over and again, the appendix will never cause an error of redundancy. Accordingly, the asynchronization operating unit 43 requests in the asynchronous manner the server 25 function to append the record (Step 214). In this event, the asynchronization operating unit 43 notifies the application of the value obtained by means of incrementing by one the relative number previously notified as the relative number for the record notified currently (Step 215), as well as of the pseudo result indicating that the updating is completed without any trouble (Step 216).

If the request for updating the record in asynchronous mode comes up to error end due to the malfunction of the device or the like, the server 25 function supplies the operational result to the client 29 function that indicates the occurrence of an error. The client node 29 holds this operational result in the operational result holding unit 51. The operational result holding unit 51 is capable of ceasing its operation by notifying the application of this error when the application issues a request later.

<Embodiment for Batch Retrieving the Records>

Figure 12:
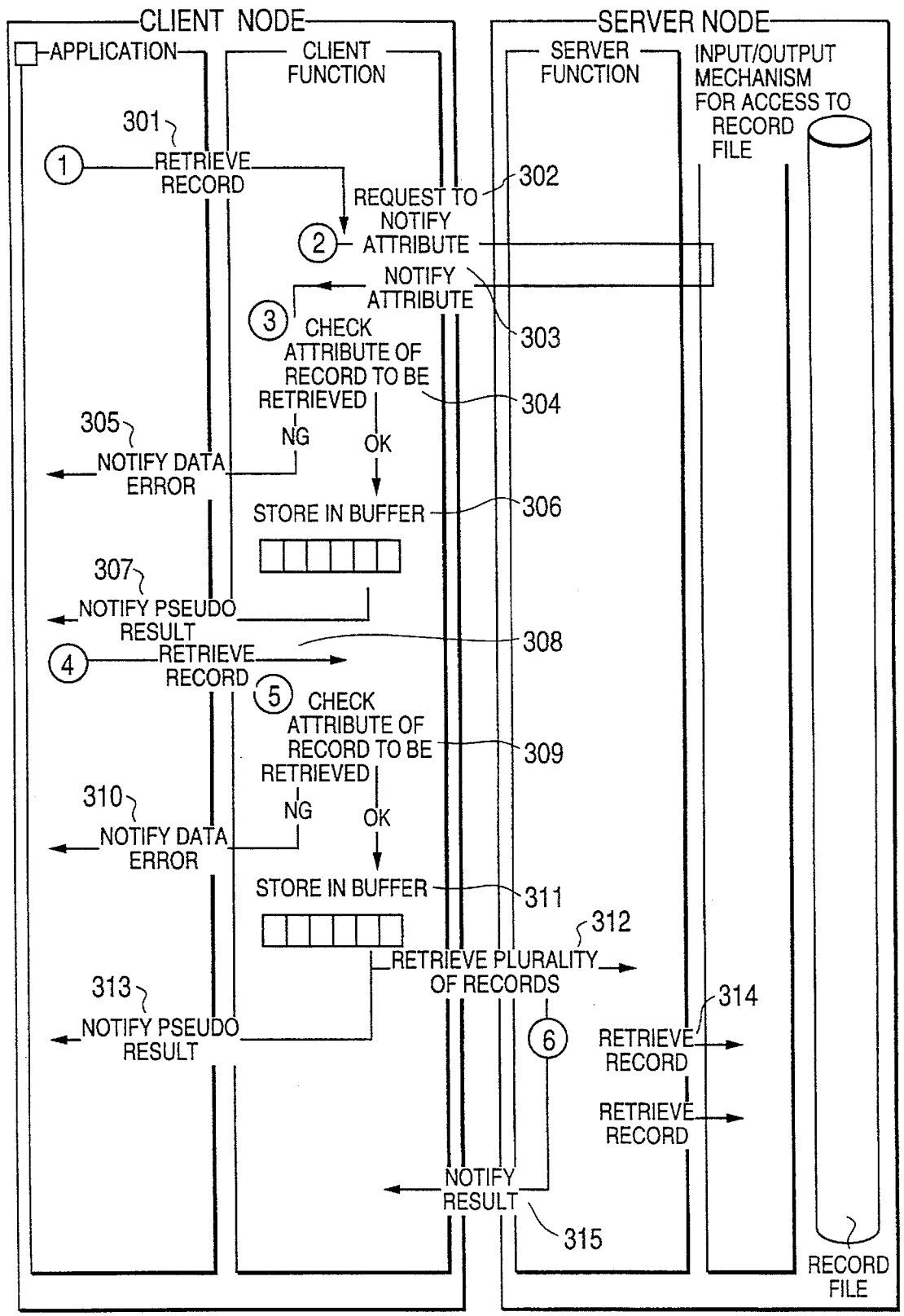
FIG. 12 shows an embodiment of a case for batch processing data records.

An embodiment for batch updating (or appending) records is shown in FIG. 12. Consider the record file 21 has data items formed of numerical values only.

Control flow is now described in detail with reference to FIG. 12.

(1) The application requests retrieval (updating or appending) of the record (Step 301).

(2) The attribute notification requesting unit 31 issues the attribute notification request to the server 25 function only when the attribute associated with each data item of the record file 21 in question has not yet been retrieved from the server node 25 (Step 302). The attribute obtaining and notifying unit 30 retrieves the attribute to notify the client node 29 of it (Step 303). As a result, the attribute associated with each data item of the record file 21 subjected to be accessed is determined (that the data items included are available only in the form of numerical values).

(3) The attribute validity verifying unit 39 checks the attribute associated with each data item on the output request issued in (1) (Step 304). (In this event, the buffer is assumed to have a free area or areas.) If any attribute associated with the data item is defined as the one other than numerical values for the data item that is to be defined by the attribute of numerical values only, the application is notified that the data to be retrieved is abnormal (Step 305). If the data to be retrieved is correct, the asynchronization operating unit 43 performs buffering operation to store the record in the buffer (Step 306). The asynchronization operating unit 43 then notify the application of the output operation is completed without any trouble (notification of the pseudo result) (Step 307).

(4) The application requests to retrieve (update or append) the subsequent record (Step 308).

(5) The attribute validity verifying unit 39 checks the attribute associated with each data item on the output request issued in (4) (Step 309). (In this event, the buffer is assumed to have a free area for one record.) If any attribute associated with the data item is defined as the one other than numerical values for the data item that is to be defined by the attribute of numerical values only, the application is notified that the data to be retrieved is abnormal (Step 310). If the data to be retrieved is correct, the record is stored in the buffer in asynchronous mode (Step 311). This makes the buffer full and the server 25 function is requested to retrieve the records stored in the buffer (Step 312). The application is notified the output operation is completed without any trouble (notification of the pseudo result) (Step 313).

(6) The server 25 function requests, in response to the request for retrieving the records issued by the client 29 function, the input/output unit 23 for the record file 21 to retrieve the records (Step 314) to notify the client node 29 of the operational result (Step 315).

If the request for updating the record in asynchronous mode comes up to abnormal end due to the malfunction of the device or the like, the server 25 function supplies the operational result to the client 29 function that indicates the occurrence of an error. The client node 29 holds this operational result in the operational result holding unit 51. The operational result holding unit 51 is capable of ceasing its operation by notifying the application of this error when the application issues a request later.

As mentioned above, in the database established on the basis of the client-server architecture according to the present invention, the database files (record files) expected to be retrieved are stored in the server node, allowing a plurality of terminals (client nodes) to use the same in common. This makes it possible to generally manage the database.

It should be understood that the present invention is not limited to the particular embodiment shown and described above, and various changes and modifications may be made without departing from the spirit and scope of the appended claims.

What is claimed is:

1. A method for controlling a remote database, comprising a server node including, a record file of the database, the record file including data sets, and an input/output unit for accessing the record file; and a client node connected to said server node, the client node including, an operational unit for operating the record file by transmitting a control command to the input/output unit, said method comprising the steps of:

providing the record file with an attribute for each respective data set of the record file, the attribute representing characteristics of the corresponding data set;

supplying an attribute notification request from said client node to said server node;

said server node notifying said client node of the attribute, in response to the attribute notification request supplied from said client node;

said client node controlling the input/output unit in the server node according to the attribute verifying whether or not the attribute of each data set of the record file is a likely source of error on accessing the record file in accordance only with the attribute;

performing synchronous operation, when it is determined that an attribute is a likely source of error, wherein said client node is required to wait for an output result supplied from said server node to the operational unit of said client node before proceeding with a subsequent transaction to an output command to the record file in said server node; and performing asynchronous operation, when it is determined that the attribute is not a likely source of error, wherein said client node can proceed with the subsequent transaction by notifying itself of a pseudo result representing completion of output to the operational unit of said client node without waiting for an output completion notification supplied from said server node to an output command to the record file in said server node.

2. A method for controlling a remote database as claimed in claim 1, wherein performing asynchronous operation comprises:

buffering the output commands to the record file in the server node in a buffer memory disposed in the client node before transmitting the output commands from the client node;

the client node notifying itself of a pseudo result representing completion of output each time an output command is stored in the buffer memory; and sending the output commands together to the server node when a predetermined number of commands are stored in the buffer memory.

3. A method for controlling a remote database as claimed 1, further comprising:

notifying the client node of occurrence of an error when the error is detected on the actual output of the server node in asynchronous mode:

storing the error notification at the client node; and ceasing the operation when the access request is issued from the client node to the server node.

4. A device for controlling a remote database, comprising:

a server node including,
 a record file of the database, and
 an input/output unit for accessing the record file;

a client node connected to the server node through a communication network and including,
 an operational unit for operating the record file by transmitting a control command to the input/output unit, operation of the operational unit in the client node allowing access to the record file;
 an attribute notification requesting unit disposed in the client node for requesting the server node to notify the Client node of an attribute associated with the record file;
 an attribute obtaining and notifying unit disposed in the server node for obtaining the attribute in response to the attribute notification request supplied from the client node and to notify, from the server node, the client node of the attribute;
 an attribute receiving unit disposed in the client node for receiving the attribute supplied from the server node; and
 an operational controlling unit for controlling the input/output unit of the server node in accordance with the attribute received by said attribute receiving unit, the operational controlling unit including,
  an attribute verifying unit for verifying, in accordance only with the attribute received by said attribute receiving unit, whether there is a possibility of causing an error on the Server node when the record file associated with the attribute is retrieved,
  a synchronization operating unit for proceeding with a subsequent operation when said attribute verifying unit determines that there is a possibility of causing an error on the server node, wherein the client node is required to wait for an output result supplied from the server node to the operational unit of the client node before proceeding with the subsequent operation of an output command to the record file in the server node, and
  an asynchronization operating unit for proceeding with the subsequent operation when said attribute verifying unit determines that there is no possibility of causing an error in the server node, wherein the client node can proceed with the subsequent operation by notifying, from the client node itself, a pseudo result representing completion of output to the operational unit of the client node without waiting for an output completion notification supplied from the server node to an output command to the record file in the server node.

5. A device for controlling a remote database as claimed in claim 4, wherein said asynchronization operating unit proceeds with the subsequent operation, wherein the client node can proceed with the subsequent operation by notifying a pseudo result representing completion of output to the operational unit of the client node without waiting for an output completion notification supplied from the server node to an output command to the record file in the server node.

6. A device for controlling a remote database as claimed in claim 4, wherein the client node includes a buffer memory; and said asynchronization operating unit successively stores in the buffer memory an output command to the record file in the server node before transmitting the output command from the client node, the client node notifies the operational unit of the client node of a pseudo result representing completion of output, and comprises a buffering processing unit for batch transmitting a command to the server node when a predetermined number of commands are stored in the buffer memory.

7. A remote database terminal device, comprising a server node including,
 a record file of the database, and
 an input/output unit for accessing the record file;

a client node, connected to the server node through a communication network, including,
 an operational unit for operating the record file by transmitting a control command to the input/output unit, operation of the operational unit in the client node allowing access to the record file;

an attribute notification requesting unit disposed in the client node for requesting the server node to notify an attribute associated with the record file;

an attribute obtaining and notifying unit disposed in the server node for obtaining the attribute in response to the attribute notification request supplied from the client node to notify, from the server node, the client node of the attribute;

an attribute receiving unit disposed in the client node for receiving the attribute supplied from the server node; and an operational controlling unit for controlling the input/output unit of the server node in accordance with the attribute received by said attribute receiving unit, said operational controlling unit including, an attribute verifying unit for verifying, in accordance only with the attribute received by raid attribute receiving unit, whether there is a possibility of causing an error in the server node when the record file associated with the attribute is retrieved, a synchronization operating unit for proceeding with a subsequent operation when said attribute verifying unit determines that there is a possibility of causing an error in the server node, wherein the client node is required to wait for an output result supplied from the server node to the operational unit of the client node before proceeding with the subsequent operation of an output command to the record file in the server node, and an asynchronization operating unit for proceeding with the subsequent operation, when said attribute verifying unit determines that them is no possibility of causing an error in the server node, wherein the client node can proceed with the subsequent operation by notifying, from the client node itself, a pseudo result representing completion of output to the operational unit of the client node without waiting for an output completion notification supplied from the server node to an output command to the record file in the server node.

8. A remote database terminal device as claimed in claim 7, wherein said asynchronization operating unit proceeds with the subsequent operation where the client node proceeds with the subsequent operation by notifying a pseudo result representing completion of output to the operational unit of the client node without waiting for an output completion notification supplied from the server node to an output command to the record file in the server node.

9. A remote database terminal device as claimed in claim 7, wherein the client node includes a buffer memory; and said asynchronization operating unit successively stores in the buffer memory an output command to the record file in the server node before transmitting the output command from the client node, the client node notifies the operational unit of the client node of a pseudo result representing completion of output, and comprises a buffering processing unit for batch transmitting a command to the server node when a predetermined number of commands are stored in the buffer memory.

10. A remote database terminal device as claimed in claim 7, wherein the server node further comprises an error notifying unit for notifying the client of occurrence of error when the error is detected in an actual output of the server node under operation in asynchronous mode;

said operational controlling unit of the client node further comprises an error result holding unit for holding an error notification when the client node receives the error notification from the error notifying unit; and the error result holding unit transmits the error notification to said operational unit when said operational unit of the client node issues a request of an access to the server node, thereby ceasing the operation of said operational unit.

11. A method for controlling a remote database, comprising a server node including, a record file of the database, the record file including data sets, and an input/output unit for accessing the record file, and a client node, connected to said server node, including an operational unit for operating the record file by transmitting a control command to the input/output unit, operation of the operational unit in said client node allows access to the record file, said method comprising the steps of:

providing the record file with an attribute for each respective data set, the attribute representing characteristics of the corresponding data set;

supplying an attribute notification request from said client node to said server node;

said server node notifying said client node of the attribute, in response to the attribute notification request supplied from said client node;

said client node controlling the input/output unit in the server node according to the attribute;

verifying the validity of an attribute value associated with each data set of the record file in accordance with the data supplied for the attribute;

performing synchronous operation when it is determined that the attribute is a likely source of error, wherein said client node is required to wait for an output result supplied from said server node to the operational unit of said client node before proceeding with a subsequent operation to an output command to the record file in said server node; and performing an asynchronous operation when it is determined that the attribute is not a likely source of error, wherein said client node can proceed with the subsequent operation by notifying, from the client node itself, a pseudo result representing completion of output to the operational unit of said client node without waiting for an output completion notification supplied from said server node to an output command to the record file in said server node.

12. A method for controlling a remote database, comprising a server node including, a record file of the database, the record file including data sets, and an input/output unit for accessing the record file; and a client node, connected to said server node, including an operational unit for operating the record file by transmitting a control command to the input/output unit, operation of the operational unit in said client node allowing access to the record file, said method comprising the steps of:

providing the record file with an attribute for each respective data set, the attribute representing characteristics of the corresponding data set;

supplying an attribute notification request from said client node to said server node;

said server node notifying said client node of the attribute, in response to the attribute notification request supplied from said client node;

said client node controlling the input/output unit in the server node according to the attribute;

verifying whether or not the attribute of each data set of the record file is a likely source of error on accessing in accordance only with an attribute name;

verifying the validity of an attribute value associated with each data set of the record file in accordance with the data supplied for the attribute;

transmitting a pseudo error notification to the operational unit of the client node when the attribute is determined on the server node as one that is a likely source of error; and performing asynchronous operation, when it is determined that the attribute is not a likely source of error, wherein said client node can proceed with a subsequent operation by notifying itself of a pseudo result representing completion of output to the operational unit of said client node without waiting for an output completion notification supplied from said server node to an output command to the record file in said server node.

13. A device for controlling a remote database, comprising:

a server node including,
a record file of the database, the record file having data sets, and
an input/output unit for accessing the record file;

a client node, connected to the server node through a communication network, including,
an operational unit for operating the record file by transmitting a control command to the input/output unit, operation of the operational unit in the client node allowing access to the record file;

an attribute notification requesting unit disposed in the client node for requesting the server node to notify the client node of an attribute associated with the record file;

an attribute obtaining and notifying unit disposed in the server node for obtaining the attribute in response to the attribute notification request supplied from the client node and to notify, from the server node, the client node of the attribute;

an attribute receiving unit disposed in the client node for receiving the attribute supplied from the server node; and an operational controlling unit for controlling the input/output unit of the server node in accordance with the attribute received by said attribute receiving unit, the operational controlling unit including,
an attribute validity verifying unit for verifying the validity of an attribute associated with each data item of the record file in accordance with the data supplied for the attribute,
a synchronization operating unit for proceeding with a subsequent operation when said attribute validity verifying unit determines that there is a possibility of causing an error in the server node, wherein the client node is required to wait for an output result supplied from the server node to the operational unit of the client node before proceeding with the subsequent operation of an output command to the record file in the server node, and
an asynchronization operating unit for proceeding with a subsequent operation when said attribute validity verifying unit determines that there is no possibility of causing an error in the server node, wherein the client node can proceed with the subsequent operation by notifying, from the client node itself, a pseudo result representing completion of output to the operational unit of the client node without waiting for an output completion notification supplied from the server node to an output command to the record file in the server node.

14. A device for controlling a remote database, comprising:

a server node including,
a record file of the database, the record file having data sets, and
an input/output unit for accessing the record file;

a client node, connected to the server node through a communication network, including
an operational unit for operating the record file by transmitting a control command to the input/output unit, operation of the operational unit in the client node allowing access to the record file;

an attribute notification requesting unit disposed in the client node for requesting the server node to notify the client node of an attribute associated with the record file;

an attribute obtaining and notifying unit disposed in the server node for obtaining the attribute in response to the attribute notification request supplied from the client node and to notify, from the server node, the client node of the attribute;

an attribute receiving unit disposed in the client node for receiving the attribute supplied from the server node; and an operational controlling unit for controlling the input/output unit of the server node in accordance with the attribute received by said attribute receiving unit, the operational controlling unit including,
an attribute verifying unit for verifying, in accordance only with an attribute value received by said attribute receiving unit, whether there is a possibility of causing an error in the server node when the record file associated with the attribute is retrieved,
an attribute validity verifying unit for verifying, when said attribute verifying unit detects an attribute value that is the likely source of error, the validity of the attribute associated with each data set of the record file in accordance with the data supplied for the attribute,
a pseudo error notifying unit for notifying the operational unit of the client node of a pseudo error when the attribute is determined as the likely source of error in the server node, and
an asynchronization operating unit for proceeding with a subsequent operation, wherein the client node can proceed with the subsequent operation by notifying a pseudo result representing completion of output to the operational unit of the client node without waiting for an output completion notification supplied from the server node to an output command to the record file in the server node.

15. A device for controlling a remote database comprising:

a server node including
a record file of the database, the record file including data sets, and
an input/output unit for accessing the record file;

a client node, connected to the server node through a communication network, including,
an operational unit for operating the record file by transmitting a control command to the input/output unit, operation of the operational unit in the client node allowing access to the record file;

an attribute notification requesting unit disposed in the client node for requesting the server node to notify the client node of an attribute associated with the record file;

an attribute obtaining and notifying unit disposed in the server node for obtaining the attribute in response to the attribute notification request supplied from the client node and to notify, from the server node, the client node of the attribute;

an attribute receiving unit disposed in the client node for receiving the attribute supplied from the server node; and an operational controlling unit for controlling the input/output unit of the server node in accordance with the attribute received by said attribute receiving unit, said operational controlling unit including, an attribute validity verifying unit for verifying the validity of an attribute value associated with a respective data set of the record file in accordance with data supplied for the attribute;

a synchronization operating unit for proceeding with a subsequent operation when said attribute verifying unit determines that there is a possibility of causing an error in the server node, wherein the client node is required to wait for an output result supplied from the server node to the operational unit of the client node before proceeding with the subsequent operation of an output command to the record file in the server node; and an asynchronization operating unit for proceeding with the subsequent operation when said attribute verifying unit determines that there is no possibility of causing an error in the server node, wherein the client node can proceed with the subsequent operation by notifying, from the client node itself, a pseudo result representing completion of output to the operational unit of the client node without waiting for an output completion notification supplied from the server node to an output command to the record file in the server node.

16. A device for controlling a remote database comprising:

a server node including,
a record file of the database, and
an input/output unit for accessing the record file;

a client node, connected to the server node through a communication network, including, an operational unit for operating the record file by transmitting a control command to the input/output unit, operation of the operational unit in the client node allowing access to the record file;

an attribute notification requesting unit disposed in the client node for requesting the server node to notify the client node of an attribute associated with the record file;

an attribute obtaining and notifying unit disposed in the server node for obtaining the attribute in response to the attribute notification request supplied from the client node and to notify, from the server node, the client node of the attribute;

an attribute receiving unit disposed in the client node for receiving the attribute supplied from the server node; and an operational controlling unit for controlling the input/output unit of the server node in accordance with the attribute received by said attribute receiving unit, the operational controlling unit including, an attribute verifying unit for verifying, in accordance only with an attribute name of the attribute received by said attribute receiving unit, whether there is a possibility of causing an error in the server node when the record file associated with the attribute is retrieved, an attribute validity verifying unit for verifying, when said attribute verifying unit detects an attribute that is a likely source of error, the validity of the attribute associated with each dam item of the record file in accordance with the data supplied for the attribute, a pseudo error notifying unit for notifying the operational unit of the client node of a pseudo error when the attribute is determined as the likely source of error in the server node, and an asynchronization operating unit for proceeding with a subsequent operation, wherein the client node can proceed with the subsequent operation by notifying a pseudo result representing completion of output to the operational unit of the client node without waiting for an output completion notification supplied from the server node to an output command to the record file in the server node.

17. A method for controlling a remote database, comprising a server node including, a record file of the database, the record file including data sets, and an input/output unit for accessing the record file; and a client node connected to said server node, the client node including, an operational unit for operating the record file by transmitting a control command to the input/output unit, said method comprising the steps of:

providing the record file with an attribute for each respective data set of the record file, the attribute representing characteristics of the corresponding data set;

supplying an attribute notification request from said client node to said server node;

said server node notifying said client node of the attribute, in response to the attribute notification request supplied from said client node;

verifying whether or not the attribute of each data set for the record file is a likely source of error on accessing the record file in accordance only with the attribute;

when the attribute is a likely source of an error, said client node waiting for an output result supplied from said server node to the operational unit of said client node before proceeding with a subsequent transaction to an output command to the record file in said server node; and when the attribute is not a likely source of an error, said client node proceeding with the subsequent transaction by notifying itself of a pseudo result representing completion of output to the operational unit of said client node without waiting for an output completion notification supplied from said server node to an output command to the record file in said server node.

* * * * *